(12) United States Patent
Komori et al.

(10) Patent No.: US 7,699,527 B2
(45) Date of Patent: Apr. 20, 2010

(54) FLUID BEARING DEVICE

(75) Inventors: Isao Komori, Kuwana (JP); Seiji Shimizu, Aichi-ken (JP)

(73) Assignee: NTN Corporation, Osaka-Fu (JP)

( * ) Notice: Subject to any disclaimer, the term of this patent is extended or adjusted under 35 U.S.C. 154(b) by 608 days.

(21) Appl. No.: 10/581,203

(22) PCT Filed: Dec. 14, 2004

(86) PCT No.: PCT/JP2004/018979

§ 371 (c)(1),
(2), (4) Date: Mar. 23, 2007

(87) PCT Pub. No.: WO2005/059387

PCT Pub. Date: Jun. 30, 2005

(65) Prior Publication Data

US 2007/0172159 A1    Jul. 26, 2007

(30) Foreign Application Priority Data

Dec. 17, 2003   (JP) .............................. 2003-419835

(51) Int. Cl.
*F16C 32/06* (2006.01)
(52) U.S. Cl. ................... 384/100; 384/107; 384/114; 384/132
(58) Field of Classification Search ................. 384/100, 384/107–110, 112, 115, 119, 120, 132, 114; 310/90, 67 R, 99.08
See application file for complete search history.

(56) References Cited

U.S. PATENT DOCUMENTS

| | | | | |
|---|---|---|---|---|
| 5,423,612 A | * | 6/1995 | Zang et al. | 384/119 |
| 5,623,382 A | | 4/1997 | Moritan et al. | |
| 5,658,080 A | * | 8/1997 | Ichiyama | 384/112 |
| 5,715,116 A | * | 2/1998 | Moritan et al. | 384/107 |
| 5,920,137 A | * | 7/1999 | Sung et al. | 310/90 |
| 5,925,949 A | * | 7/1999 | Jung et al. | 310/67 R |
| 6,034,453 A | * | 3/2000 | Eom et al. | 310/90 |
| 6,066,903 A | * | 5/2000 | Ichiyama | 310/90 |
| 6,583,952 B1 | * | 6/2003 | Grantz et al. | 360/99.08 |
| 6,609,829 B2 | * | 8/2003 | Saito et al. | 384/100 |
| 6,678,115 B2 | * | 1/2004 | Khan | 360/99.08 |
| 7,063,462 B2 | * | 6/2006 | Aiello et al. | 384/107 |
| 7,135,797 B2 | * | 11/2006 | Khan et al. | 310/90 |
| 2003/0091249 A1 | | 5/2003 | Kurimura et al. | |

(Continued)

FOREIGN PATENT DOCUMENTS

JP   6-223494   8/1994

(Continued)

*Primary Examiner*—Marcus Charles
(74) *Attorney, Agent, or Firm*—Wenderoth, Lind & Ponack, L.L.P.

(57) ABSTRACT

Disclosed is a fluid dynamic bearing device in which it is possible to prevent detachment of the shaft member reliably and at low cost without involving any increase in the device size. In a thrust bearing portion T, the lower end surface of the shaft member is held in contact with a thrust plate, and the shaft member is rotatably supported in the thrust direction. Protrusions extending radially inwards are provided on a sealing portion attached to an opening of the housing, and these protrusions are engaged with a small diameter portion formed on the outer peripheral surface of the shaft member, thereby preventing the shaft member from coming off.

20 Claims, 4 Drawing Sheets

U.S. PATENT DOCUMENTS

2003/0169952 A1  9/2003  Yamashita et al.

FOREIGN PATENT DOCUMENTS

| JP | 8-251864 | 9/1996 |
| JP | 11-55898 | 2/1999 |
| JP | 2002-171712 | 6/2002 |
| JP | 2003-239951 | 8/2003 |
| JP | 2003-239974 | 8/2003 |
| JP | 2003-294049 | 10/2003 |
| JP | 2003-307212 | 10/2003 |

* cited by examiner

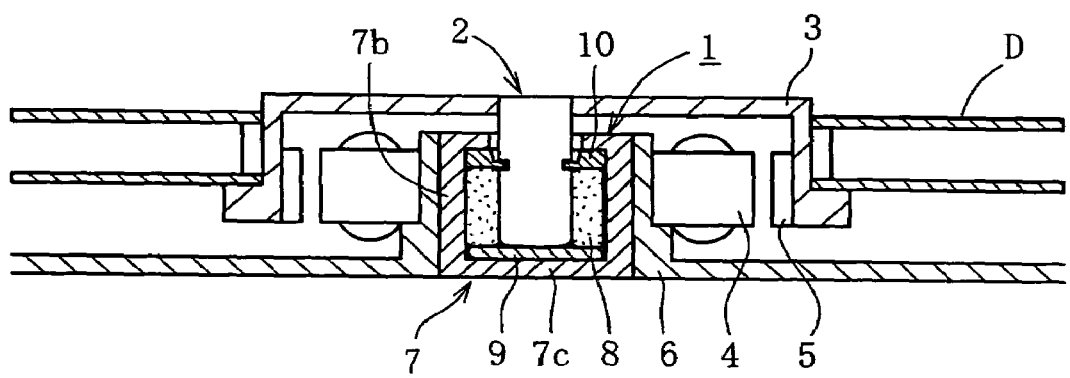
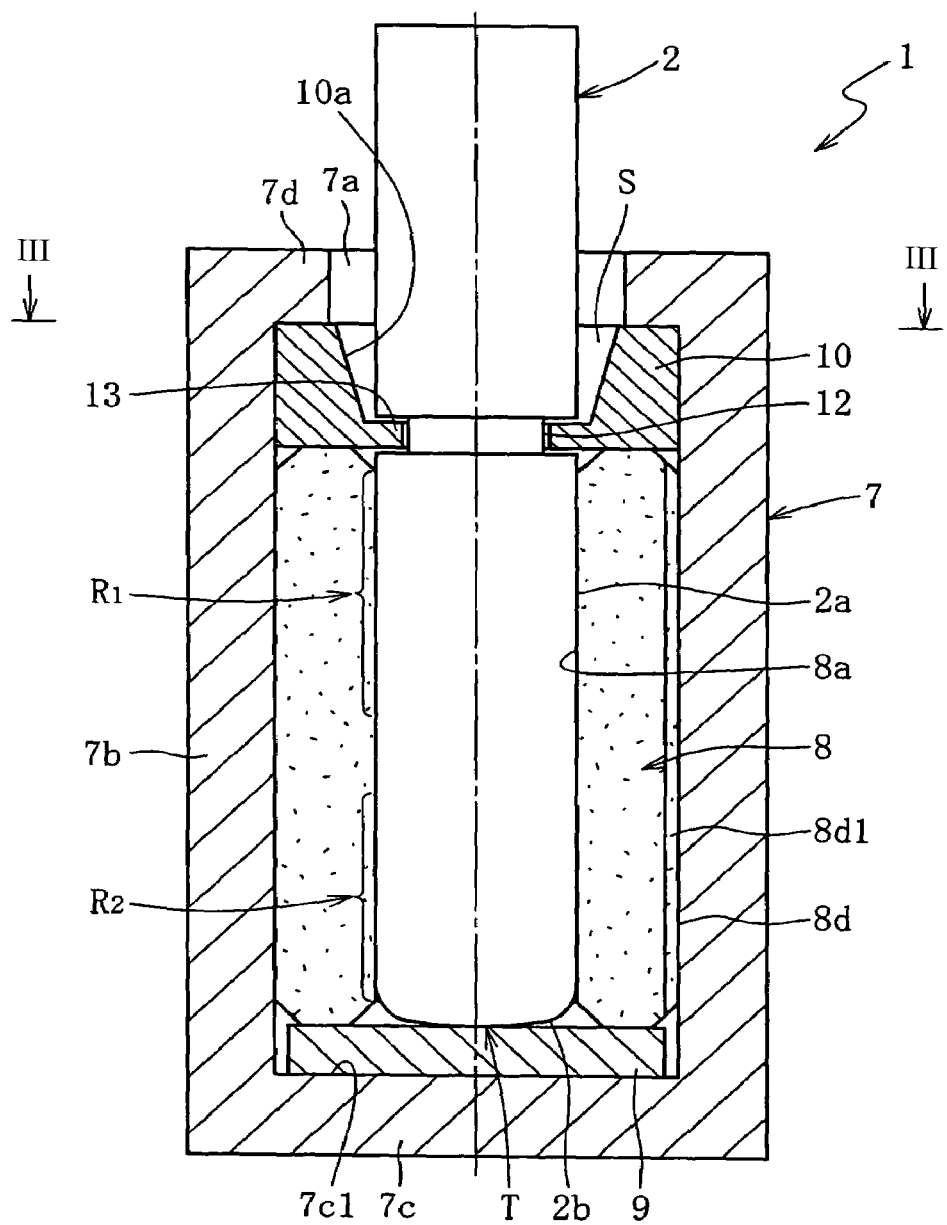

FLUID BEARING DEVICE

BACKGROUND OF THE INVENTION

1. Field of the Invention

The present invention relates to a fluid dynamic bearing device rotatably supporting a shaft member by a dynamic pressure action in a non-contact fashion through the intermediation of a lubricant film generated in a radial bearing clearance. This bearing device is suitable for use in a spindle motor of an information apparatus, for example, a magnetic disc apparatus, such as an HDD or an FDD, an optical disc apparatus, such as a CD-ROM, a CD-R/RW, or a DVD-ROM/RAM, or a magneto-optical disc apparatus, such as an MD or an MO, the polygon scanner motor of a laser beam printer (LBP), a color wheel for a projector, or the small motor of an electric apparatus, such as an axial flow fan.

2. Related Background Art

Apart from high rotational accuracy, an improvement in speed, a reduction in cost, a reduction in noise, etc. are required of the motors as mentioned above. One of the factors determining such requisite performances is the bearing supporting the spindle of the motor. Recently, use of a fluid dynamic bearing superior in the above requisite performances is being considered, or such a fluid dynamic bearing has been actually put into practical use. This type of fluid dynamic bearing is roughly classified into two categories: a dynamic pressure bearing equipped with a dynamic pressure generating means for generating dynamic pressure in a lubricant in a bearing clearance, and a circular bearing equipped with no such dynamic pressure generating means (a bearing whose bearing surface is of a circular configuration).

A fluid dynamic bearing device using such a fluid dynamic bearing comprises a radial bearing portion supporting a shaft member in a radial direction, and a thrust bearing portion supporting it in a thrust direction. Usually, in a fluid dynamic bearing device, a fluid dynamic bearing is used in the radial bearing portion, and a fluid dynamic bearing or a pivot bearing supporting the axial end of the shaft member in a contact fashion with a thrust plate is used in the thrust bearing portion.

In a fluid dynamic bearing device whose thrust bearing portion is formed by a pivot bearing, the shaft member is pressed against the thrust plate by a magnetic force between the rotor and stator of the motor, whereby the shaft member is regulated in its axial movement to the side opposite to the thrust plate. However, when an impact load or the like in excess of the above-mentioned magnetic force is applied to the motor, or when the motor is used in an upright or a horizontal position, there is the possibility of the shaft member moving axially to the side opposite to the thrust plate to be detached from the bearing sleeve.

In view of this, to prevent such detachment of the shaft member, there is conventionally provided a flange-like detachment preventing portion in the outer periphery of the shaft member, wherein the detachment preventing portion is axially engaged with an end surface of the radial bearing (JP 2003-294049 A). Alternatively, a detachment preventing member is provided on the stationary side, and is engaged with a recess in the shaft (JP 2000-171712 A).

Both of the conventional techniques as disclosed in the above-mentioned publications require an additional member for preventing detachment. Thus, an increase in the number of parts is involved. Further, it is necessary to provide a step for mounting this additional member, resulting in an increase in cost. At the same time, to install this detachment preventing member, it is necessary to additionally secure an axial mounting space in the bearing device, which impedes a reduction in the size of the fluid dynamic bearing device.

SUMMARY OF THE INVENTION

It is accordingly an object of the present invention to provide a fluid dynamic bearing device which involves no increase in size and which helps to prevent detachment of the shaft member reliably and at low cost.

In order to achieve the above-mentioned object, a fluid dynamic bearing device of the present invention includes: a housing having at one end an opening and at the other end a bottom portion, a sealing portion sealing the opening of the housing, a bearing sleeve and a shaft member that are accommodated in the housing, a radial bearing portion having a radial bearing clearance between an outer peripheral surface of the shaft member and an inner peripheral surface of the bearing sleeve and adapted to support the shaft member radially in a non-contact fashion by means of a lubricant film generated when the shaft member and the bearing sleeve rotate relative to each other, and a thrust bearing portion supporting the shaft member in a thrust direction, in which the sealing portion is provided with a protrusion extending radially inwards, and the shaft member is provided with a small diameter portion, the protrusion and the small diameter portion being axially engaged with each other to thereby prevent the shaft member from coming off.

In this construction, when the shaft member receives an external force, and a gravitational force and makes a relative movement to one axial side with respect to the housing (the housing external side), the protruding portion and the small diameter portion are axially engaged with each other, so that a further axial relative movement of the shaft member is restricted, whereby it is possible to retain the shaft member inside the housing and prevent it from being detached from the housing.

In particular, since the protruding portion to be engaged with the shaft member is provided in the sealing portion, there is no need for any additional detachment preventing member. Accordingly, there is no need for a mounting step or a mounting space for such a detachment preventing member, thus making it possible to achieve a reduction in the cost and size of the fluid dynamic bearing device.

When assembling the fluid dynamic bearing device, the shaft member is inserted into the inner periphery of the bearing sleeve. As the shaft member is inserted, the protruding portion, interfering with the shaft member, is temporarily spread out. Thereafter, when the protruding portion and the small diameter portion are opposed to each other, the protruding portion undergoes an elastic divergence in diameter and is engaged with the small diameter portion. In this regard, when the protruding portion is formed in the inner periphery of the sealing portion partially in the circumferential direction, it becomes easier for the protruding portion to undergo elastic deformation, thereby achieving an improvement in the operability of the shaft member inserting process.

Further, if the sealing portion is formed of resin, it becomes easier for the protruding portion, which is also formed of resin, to deform, thus making it possible to achieve an improvement in the operability of the shaft member inserting process.

When there is formed, in the inner periphery of the sealing portion, a diameter dilation surface enlarging the distance from the outer peripheral surface of the shaft member on the external side of the housing, a sealing space formed between the diameter dilation surface and the outer peripheral surface of the shaft member functions as a tapering seal, whereby it is possible to further enhance the sealing property of the sealing portion.

The sealing portion may be separate from the housing (see FIG. 2). In this case, detachment prevention of the sealing portion can be effected, for example, by inwardly squeezing the housing. When the sealing portion is formed integrally with the housing (see FIG. 4), there is no need for such squeezing for detachment prevention of the sealing portion.

By assembling a motor with the fluid dynamic bearing device as described above, a rotor magnet fixed to the shaft member, and a stator coil fixed to the housing, it is possible to provide a motor (a spindle motor, polygon scanner motor, or other small-sized motor) suitable for information apparatuses as mentioned above.

According to the present invention, it is possible to reliably prevent the shaft member from being detached from the housing without having to mount any additional component/member for detachment prevention. Thus, it is possible to avoid an increase in the cost and size of the bearing device.

BRIEF DESCRIPTION OF THE DRAWINGS

FIG. 1 is a longitudinal sectional view of a spindle motor in which a fluid dynamic bearing device according to the present invention is incorporated;

FIG. 2 is a longitudinal sectional view of the fluid dynamic bearing device;

DESCRIPTION OF THE PREFERRED EMBODIMENTS

Figure 3:
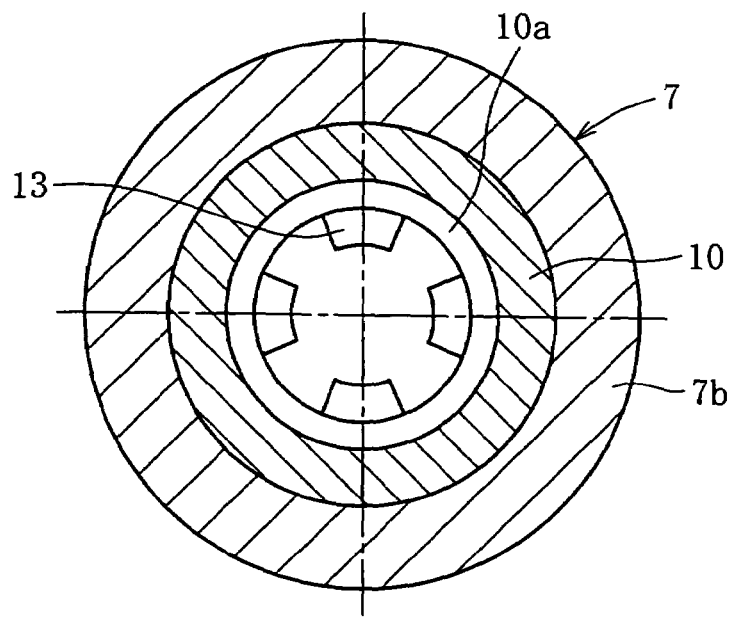
FIG. 3 is a sectional view taken along the line III-III of FIG. 2.

Embodiments of the present invention will now be described.

FIG. 1 shows, as an example of an information apparatus spindle motor in which a fluid dynamic bearing device is incorporated, a spindle motor for use in a disc drive apparatus, such as an HDD. This motor includes a fluid dynamic bearing device 1 rotatably supporting a shaft member 2, a rotary member 3 (disc hub) mounted to the shaft member 2, a stator coil 4 and a rotor magnet 5 that are opposed to each other through the intermediation, for example, of a radial gap, and a bracket 6. The stator coil 4 is mounted to the outer periphery of the bracket 6, and the rotor magnet 5 is mounted to the inner periphery of the disc hub 3. The disc hub 3 is capable of holding in its outer periphery one or a plurality of discs D, such as magnetic discs. When the stator coil 4 is energized, the rotor magnet 5 is rotated by an excitation force between the stator coil 4 and the rotor magnet 5, and, with that, the disc hub 3 and the shaft member 2 rotate integrally.

FIG. 2 shows, as a first embodiment of the fluid dynamic bearing device 1, a fluid dynamic bearing device equipped with a dynamic pressure generating means for generating dynamic pressure in a lubricant in a radial bearing clearance. This dynamic bearing device 1 consists of, as main components, the shaft member 2, a housing 7 formed as a bottomed cylinder having an opening 7a at one end (the upper end in FIG. 2) and a bottom portion 7c at the other end (the lower end in FIG. 2), a cylindrical bearing sleeve 8 accommodated in the housing 7, and a sealing portion 10 sealing the opening 7a of the housing 7. As described below, between the inner peripheral surface 8a of the bearing sleeve 8 and the outer peripheral surface 2a of the shaft member 2, a first radial bearing portion R1 and a second radial bearing portion R2 are provided so as to be axially spaced apart from each other. Further, between the bottom portion 7c of the housing 7 and the lower end surface 2b of the shaft member 2, there is provided a thrust bearing portion T. For the sake of convenience, in the following description, the housing opening 7a side will be referred to as the upper side, and the housing bottom portion 7c side will be referred to as the lower side.

The housing 7 is formed, for example, of a soft metal material, such as brass, or a resin material, such as a thermoplastic resin, and integrally contains a cylindrical side portion 7b and the bottom portion 7c. On the inner bottom surface of the bottom portion 7c, there is arranged a resin thrust plate 9 serving as a thrust receiver. At the upper end of the housing 7, there is provided a fixing portion 7d formed through plastic deformation by inward squeezing.

The shaft member 2 is formed, for example, of a metal material, such as stainless steel, and its lower end surface 2b is formed in a convex spherical configuration. In the outer peripheral surface 2a of the shaft member 2, there is formed a small diameter portion in the form of an annular recess formed by turning, forging, etc.

The bearing sleeve 8 is formed in a cylindrical configuration by using a porous material consisting, for example, of a sintered metal, in particular, a sintered material whose main component is copper, and is fixed to a predetermined position of the inner peripheral surface 7c of the housing 7.

Figure 5:
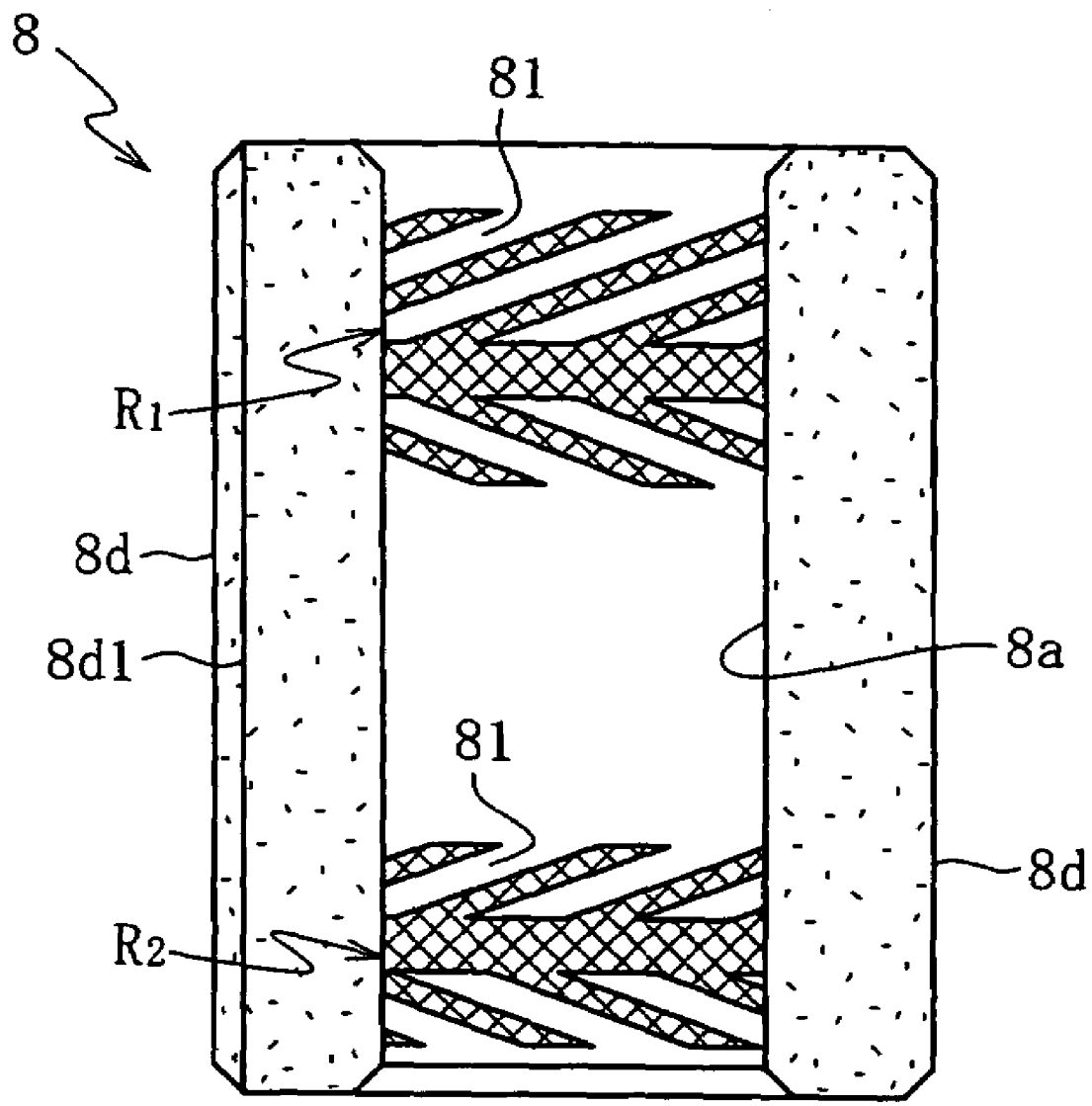
FIG. 5 is a longitudinal sectional view of a bearing sleeve.

On the inner peripheral surface 8a of this bearing sleeve 8 formed of a sintered metal, there are formed two areas axially spaced apart from each other and respectively constituting bearing surfaces of the first radial bearing portion R1 and the second radial bearing portion R2, and in these two areas, as shown in FIG. 5, there are formed, as the dynamic pressure generating means, a plurality of dynamic pressure grooves 81 arranged, for example, in a herringbone-like fashion. Further, on the outer peripheral surface 8d of the bearing sleeve 8, there is formed one or a plurality of axial grooves 8d1 extending over the entire axial length thereof.

The shaft member 2 is inserted into the bore defined by the inner peripheral surface 8a of the bearing sleeve 8, and its outer peripheral surface 2a is opposed to the upper and lower areas constituting the radial bearing surfaces of the inner peripheral surface 8a of the bearing sleeve 8 through the intermediation of the radial bearing clearance. Further, the lower end surface 2b of the shaft member 2 is held in contact with the upper surface of the thrust plate 9.

The sealing portion 10 of this embodiment is an annular member separated from the housing 7, and is formed by injection molding of a thermoplastic resin. This sealing portion 10 is press-fitted into the inner peripheral surface of the housing opening 7a prior to the formation of the fixing portion 7d by squeezing, and is fixed thereto by press fitting, adhesion or the like. At this time, the lower end surface of the sealing portion 10 is in contact with the upper end surface of the bearing sleeve 8.

A tapered diverging surface 10a is formed on the inner peripheral surface of the sealing portion 10. This diverging surface 10a is inclined such that the distance between it and the outer peripheral surface 2a of the shaft member 2 gradually increases toward the outer side of the housing (upwardly), and a sealing space S is defined between this tapered diverging surface 10a and the cylindrical outer peripheral surface 2a of the shaft member 2. The sealing space S functions as a tapered seal utilizing a capillary phenomenon, and prevents lubricant from leaking to the exterior of the housing 7, without allowing any air to stay in the housing. The volume of the sealing space S is set so as to exceed the variation in volume of the lubricant with temperature changing within the range of temperature of use, so that the oil level of the lubricant is always inside the sealing space S.

Protrusions 13 protruding radially inwards are integrally formed on the portion of the inner peripheral surface of the sealing portion 10 opposed to the small diameter portion 12 of the shaft member 2. While in this embodiment the protrusions 13 are formed at the lower end of the sealing portion 10, with the diverging surface 10a being formed above the same, the protrusions 13 may also be formed at an arbitrary position, for example, in the middle area with respect to the axial direction of the inner peripheral surface of the sealing portion 10. As shown in FIG. 3, the protrusions 13 are formed circumferentially in parts on the inner peripheral surface of the sealing portion 10. The protrusions 13 are formed in an arbitrary number at one or a plurality of positions (at four positions in the example shown in FIG. 3).

The inner diameter dimension of the protrusions 13 is smaller than the outer diameter dimension of the outer peripheral surface 2a of the shaft member 2, and larger than the outer diameter dimension of the small diameter portion 12. The axial dimension of the protrusions 13 is smaller than the axial dimension of the small diameter portion 12. As a result, during normal rotation there are formed axial gaps and radial gaps between the protrusions 13 and the small diameter portion 12, thereby preventing the sealing portion 10 from coming into contact with the shaft member 2. Taking into account the dimensional tolerances, assembly errors, etc. of the components, it is desirable for the size of these gaps to be 0.05 mm or more. These minute gaps can be easily realized by forming the sealing portion 10 as an injection-molded resin product allowing molding with high accuracy.

After fixing the bearing sleeve 8 and the sealing portion 10 to the inner peripheral surface of the housing 7, the shaft member 2 is inserted into the bore defined by the inner periphery of the bearing sleeve 8. Since the protrusions 13 are formed of a highly elastic resin material and circumferentially in parts, the protrusions 13 are spread out as the shaft member 2 is inserted. When the lower end surface 2b of the shaft member 2 comes into contact with the thrust plate 9, the protrusions 13 are opposed to the small diameter portion 12, and are fitted into the small diameter portion 12 while being elastically diverged. As a result, the protrusions 13 are axially engaged with the small diameter portion 12, thereby preventing the shaft member 2 from coming off. As long as the elasticity of the protrusions 13 needed for the step of inserting the shaft member 2 is thus ensured, it is also possible for the sealing portion 10 to be formed of metal instead of resin.

After the insertion of the shaft member 2, the upper end portion of the housing 7 is inwardly squeezed to thereby form the fixing portion 7d. The sealing portion 10 is constrained from above by this fixing portion 7d, so that, even when a large pull-out force is applied to the shaft member 2, the sealing portion 10 is prevented from coming off.

After the completion of the above assembly, lubricant is poured in. That is, the fluid dynamic bearing device 1 with no lubricant poured therein is first assembled, and is then immersed in lubricant in a vacuum vessel; thereafter, it is released under the atmospheric pressure, and the interior space of the housing 7 including the internal pores of the bearing sleeve 8, formed of sintered metal, is filled with lubricant.

In this fluid dynamic bearing device 1, when the shaft member 2 rotates, a dynamic pressure of the lubricant is generated in the radial bearing clearance, and the shaft member 2 is rotatably supported in the radial direction in a non-contact manner through the intermediation of a lubricant film. In this way, there are formed the first radial bearing portion R1 and the second radial bearing portion R2 supporting the shaft member 2 rotatably in the radial direction in a non-contact fashion. At the same time, the lower end surface 2b of the shaft member 2 is supported in a contact fashion by the thrust plate 9, whereby there is formed the thrust bearing portion T rotatably supporting the shaft member 2 in the thrust direction in a contact fashion.

As described above, in the present invention, the detachment prevention structure for the shaft member 2 is integrated with the sealing portion 10. Thus, there is no need to separately install a detachment preventing member as in the prior art, which means it is not necessary to provide a mounting step or a mounting space for such a member. Thus, it is possible to prevent the shaft member 2 from coming off at low cost and without involving any increase in the size of the fluid dynamic bearing device 1.

Figure 4:
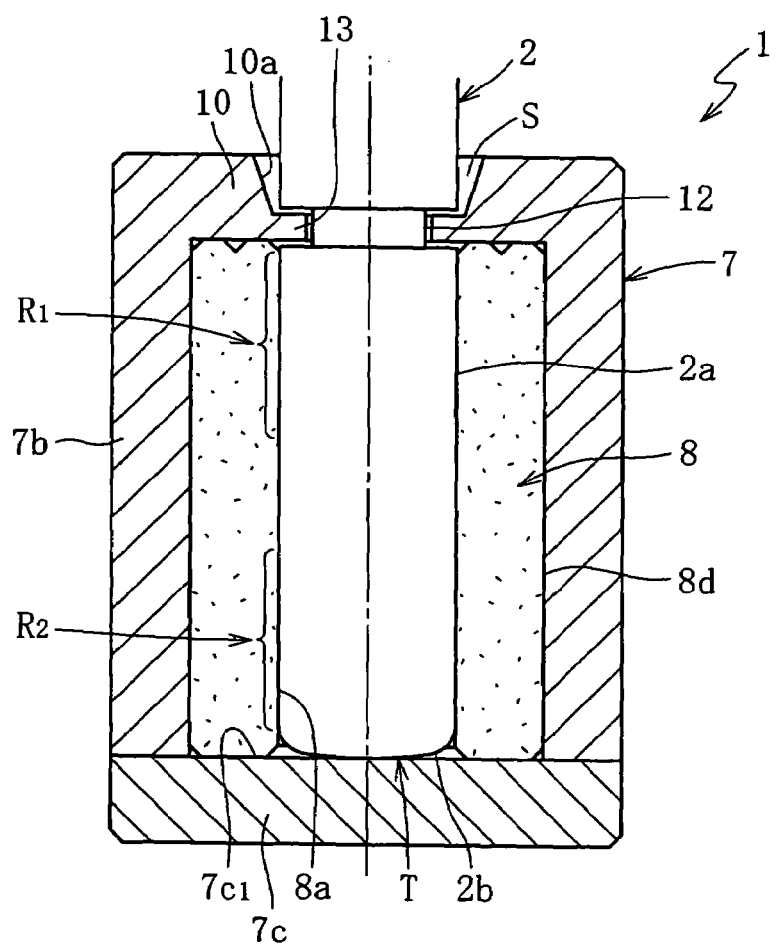
FIG. 4 is a longitudinal sectional view of a fluid dynamic bearing device according to another embodiment of the present invention.

FIG. 4 shows a second embodiment of the present invention, which differs from the first embodiment in that the sealing portion 10 is integrated with the housing 7 and that the housing bottom portion 7c is separated from the housing 7. In this embodiment also, there are provided on the sealing portion 10 inwardly protruding portions 13, which are engaged with the small diameter portion 12 provided on the shaft member 2, whereby it is possible to prevent the shaft member 2 from coming off.

While in the above-described construction the thrust bearing portion T is formed by a pivot bearing contact-supporting the shaft member 2 in the thrust direction, it is also possible to non-contact-support the shaft member 2 in the thrust direction by forming the thrust bearing portion T by a fluid dynamic bearing. In a possible example of the fluid dynamic bearing, the lower end portion of the shaft member 2, for example, is formed as a flat surface, and a dynamic pressure generating means, such as a plurality of dynamic pressure grooves arranged in a spiral form, is formed in one of the above-mentioned flat surface and a surface opposed to the flat surface (which, in the example shown, is the upper end surface of the thrust plate 9).

Figure 6A:
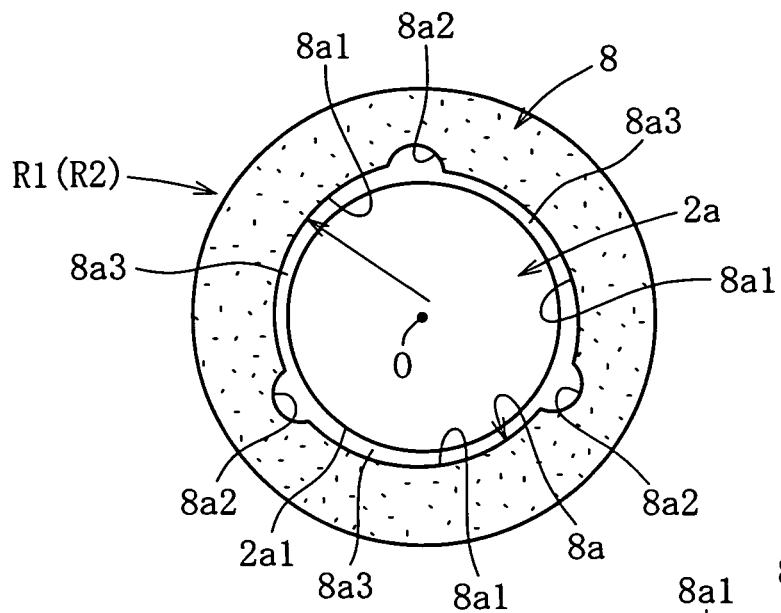
FIGS. 6A, 6B and 6C are sectional views of a radial bearing portion in a fluid dynamic bearing device according to another embodiment of the present invention.

The radial bearing portions R1 and R2 can also be formed by multi-arc bearings. FIG. 6A shows an example thereof, in which a plurality of arcuate surfaces 8a1 are formed in the areas of the inner peripheral surface 8a of the bearing sleeve 8 constituting the respective radial bearing surfaces of the first radial bearing portion R1 and the second radial bearing portion R2 (also referred to as the "tapered bearings"). The arcuate surfaces 8a1 are eccentric arcuate surfaces whose centers are offset from the rotation axis O by the same distance, and are formed at equal intervals in the circumferential direction. Between the eccentric arcuate surfaces 8a1, there are formed axial separation grooves 8a2.

By inserting the shaft portion 2a of the shaft member 2 into the bore defined by the inner peripheral surface 8a of the bearing sleeve 8, the radial bearing clearances of the first and second radial bearing portions R1 and R2 are formed between the eccentric arcuate surfaces 8a1 and separation grooves 8a2 of the bearing sleeve 8 and the circular outer peripheral surface 2a of the shaft portion 2a. Of the radial bearing clearances, the areas opposed to the eccentric arcuate surfaces 8a1 constitute wedge-like clearances 8a3 gradually reduced in clearance width in one circumferential direction. The width-reducing direction of the wedge-like clearances 8a3 coincides with the rotating direction of the shaft member 2.

Figure 6B:
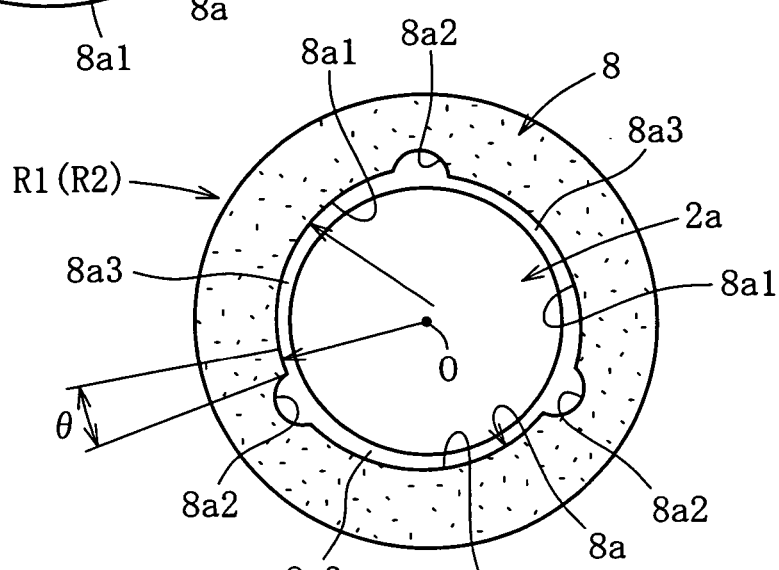
Figure 6C:
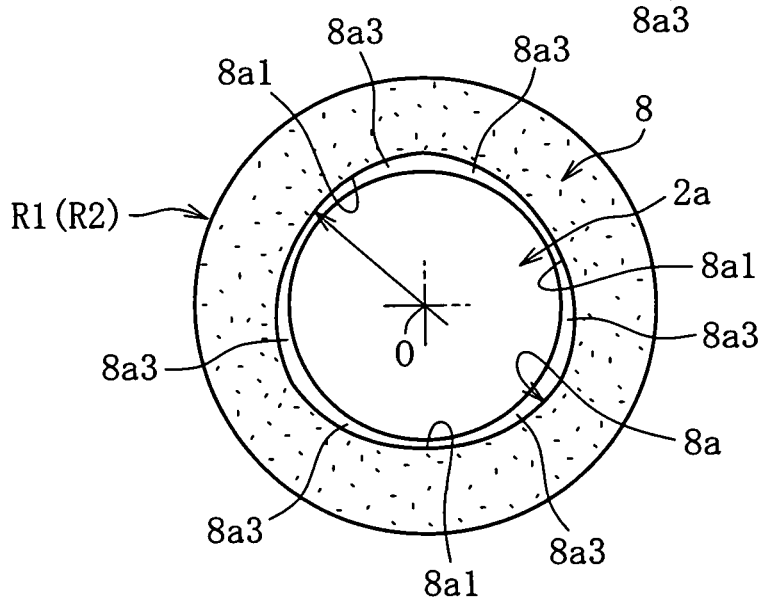

FIGS. 6B and 6C show other embodiments of the multi-arc bearings forming the first and second radial bearing portions R1 and R2.

Of these, in the embodiment shown in FIG. 6B, the construction shown in FIG. 6A is modified such that predetermined areas θ on the minimum clearance side of the eccentric arcuate surfaces 8a1 are formed by concentric arcs which have the rotation axis O as their centers. Thus, in each predetermined area θ, the radial bearing clearance (minimum clearance) is fixed. A multi-arc bearing thus constructed is also referred to as a tapered flat bearing.

In FIG. 6C, the areas of the inner peripheral surface 8a of the bearing sleeve 8 constituting the radial bearing surfaces are formed by three arcuate surfaces 8a1, with the centers of the three arcuate surfaces 8a1 being offset by the same distance from the rotation axis O. In each of the areas defined by the three eccentric arcuate surfaces 8a1, the radial bearing clearance is configured so as to be gradually diminished in both circumferential directions.

While the multi-arc bearings of the first and second radial bearing portions R1 and R2 are all three-arc bearings, this should not be construed restrictively; it is also possible to adopt a so-called four-arc bearing, five-arc bearing, or, further, a multi-arc bearing with six arcs or more. Further, apart from the construction in which two radial bearing portions are axially spaced apart from each other as in the case of the radial bearing portions R1 and R2, it is also possible to adopt a construction in which a single radial bearing portion is provided so as to extend over the upper and lower areas of the inner peripheral surface of the bearing sleeve 8.

Further, while in the above embodiment multi-arc bearings are adopted as the radial bearing portions R1 and R2, it is also possible to adopt a bearing of some other type. For example, although not shown, it is also possible to use, in the area of the inner peripheral surface 8a of the bearing sleeve 8 constituting the radial bearing surface, a step bearing in which there are formed dynamic pressure grooves in the form of a plurality of axial grooves.

What is claimed is:

1. A fluid dynamic bearing device comprising:
   a housing having an opening at a first end thereof and a bottom portion at a second end thereof;
   a sealing portion sealing the opening of the housing;
   a bearing sleeve accommodated in the housing;
   a shaft member accommodated in the housing;
   a radial bearing portion having a radial bearing clearance between an outer peripheral surface of the shaft member and an inner peripheral surface of the bearing sleeve, the radial bearing portion radially supporting the shaft member in a non-contact fashion by means of a lubricant film when the shaft member rotates relative to the bearing sleeve; and
   a thrust bearing portion supporting the shaft member in a thrust direction,
   wherein a sealing space is provided between an inner peripheral surface of the sealing portion the outer peripheral surface of the shaft member,
   wherein the inner peripheral surface of the sealing portion includes a protrusion extending radially inwards, the protrusion constituting a first portion of the inner peripheral surface which protrudes from a second portion of the inner peripheral surface, and
   wherein the shaft member is provided with a small diameter portion, the protrusion and the small diameter portion being axially engaged with each other to prevent the shaft member from coming off.

2. A fluid dynamic bearing device according to claim 1, wherein the protrusion is formed as a plurality of protrusion parts circumferentially spaced around the inner peripheral surface of the sealing portion.

3. A motor comprising the fluid dynamic bearing device of claim 2, wherein a rotor magnet is fixed to the shaft member and a stator coil is fixed to the housing.

4. A fluid dynamic bearing device according to claim 1, wherein the sealing portion is formed of resin.

5. A motor comprising the fluid dynamic bearing device of claim 4, wherein a rotor magnet is fixed to the shaft member and a stator coil is fixed to the housing.

6. A fluid dynamic bearing device according to claim 1, wherein the second portion of the inner peripheral surface is a diverging surface, the diverging surface being spaced farther from outer peripheral surface of the shaft member at a top portion of the diverging surface than at a bottom portion of the diverging surface.

7. A motor comprising the fluid dynamic bearing device of claim 6, wherein a rotor magnet is fixed to the shaft member and a stator coil is fixed to the housing.

8. A fluid dynamic bearing device according to claim 1, wherein the sealing portion and the housing are provided as separate components, and wherein the sealing portion is prevented from coming off through squeezing of the housing.

9. A motor comprising the fluid dynamic bearing device of claim 8, wherein a rotor magnet is fixed to the shaft member and a stator coil is fixed to the housing.

10. A fluid dynamic bearing device according to claim 1, wherein the sealing portion and the housing are formed as an integral unit.

11. A motor comprising the fluid dynamic bearing device of claim 10, wherein a rotor magnet is fixed to the shaft member and a stator coil is fixed to the housing.

12. A motor comprising the fluid dynamic bearing device of claim 1, wherein a rotor magnet is fixed to the shaft member and a stator coil is fixed to the housing.

13. The fluid dynamic bearing device of claim 1, wherein an oil level of lubricant oil in the fluid dynamic bearing device is inside the sealing space.

14. The fluid dynamic bearing device of claim 1, wherein the shaft member and the bearing sleeve are arranged such that a dynamic pressure of lubricant in the housing is generated in the radial bearing clearance when the shaft member rotates relative to the bearing sleeve so as to form the radial bearing portion.

15. The fluid dynamic bearing device of claim 14, wherein the dynamic pressure forms the lubricant into the lubricant film between shaft member and the inner peripheral surface of the bearing sleeve.

16. The fluid dynamic bearing device of claim 15, the second portion of the inner peripheral surface is a diverging surface, the diverging surface being spaced farther from outer peripheral surface of the shaft member at a top portion of the diverging surface than at a bottom portion of the diverging surface.

17. The fluid dynamic bearing device of claim 1, wherein the protrusion portion constitutes only a partial portion of the inner peripheral surface in an axial direction of the sealing portion, and the second portion constitutes a remainder of the inner peripheral surface in the axial direction of the sealing portion.

18. The fluid dynamic bearing device of claim 1, wherein the protrusion portion constitutes only a partial portion of the inner peripheral surface in an axial direction of the sealing portion, and wherein the protrusion extends radially inwardly toward the shaft member, and the second diverging surface slopes radially outwardly away from the shaft member.

19. The fluid dynamic bearing device of claim 1, wherein only the protrusion axially engages the small diameter portion of the shaft member.

20. A fluid dynamic bearing device comprising:
a housing having an opening at a first end thereof and a bottom portion at a second end thereof;
a sealing portion sealing the opening of the housing;
a bearing sleeve accommodated in the housing;
a shaft member accommodated in the housing;
a radial bearing portion having a radial bearing clearance between an outer peripheral surface of the shaft member and an inner peripheral surface of the bearing sleeve, the radial bearing portion radially supporting the shaft member in a non-contact fashion by means of a lubricant film when the shaft member rotates relative to the bearing sleeve; and
a thrust bearing portion supporting the shaft member in a thrust direction,
wherein a sealing space is provided between an inner peripheral surface of the sealing portion the outer peripheral surface of the shaft member,
wherein the inner peripheral surface of the sealing portion includes a protrusion extending radially inwards, the protrusion constituting a first portion of the inner peripheral surface which protrudes from a second portion of the inner peripheral surface, and
wherein the shaft member is provided with a small diameter portion, the protrusion and the small diameter portion being axially engaged with each other to prevent the shaft member from coming off,
wherein the protrusion is formed circumferentially in parts in as a plurality of protrusion parts circumferentially spaced around the inner periphery peripheral surface of the sealing portion,
wherein the second portion of the inner peripheral surface is a diverging surface, the diverging surface being spaced farther from outer peripheral surface of the shaft member at a top portion of the diverging surface than at a bottom portion of the diverging surface,
wherein the shaft member and the bearing sleeve are arranged such that a dynamic pressure of lubricant in the housing is generated in the radial bearing clearance when the shaft member rotates relative to the bearing sleeve so as to form the radial bearing portion,
wherein the dynamic pressure forms the lubricant into the lubricant film between shaft member and the inner peripheral surface of the bearing sleeve.

* * * * *